May 25, 1926.
L. S. HALL
1,586,362
GEAR BOX FOR THREADING MACHINES AND THE LIKE
Filed June 20, 1925 2 Sheets-Sheet 1
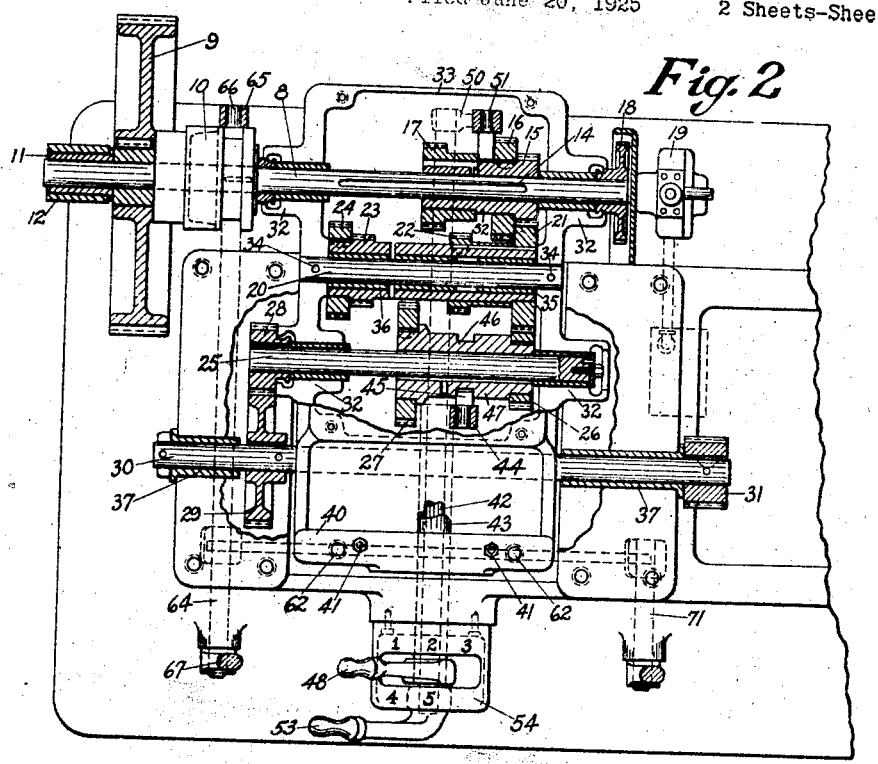
INVENTOR
LESLIE S. HALL
BY
ATTORNEY May 25, 1926.
L. S. HALL
1,586,362
GEAR BOX FOR THREADING MACHINES AND THE LIKE
Filed June 20, 1925    2 Sheets-Sheet 2
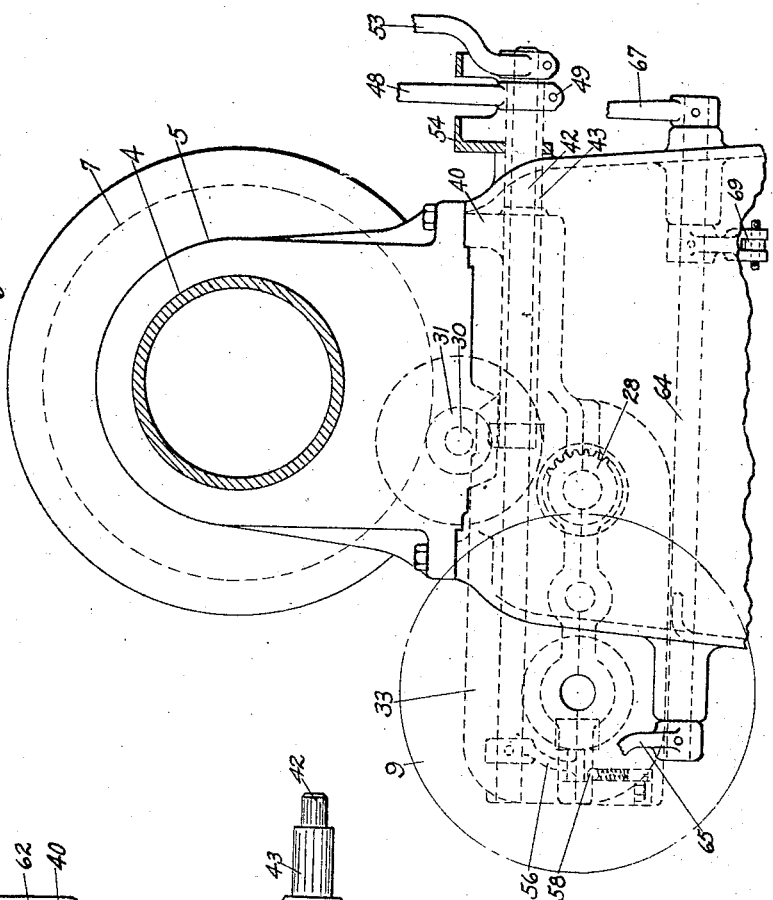
INVENTOR
LESLIE S. HALL
BY
ATTORNEY Patented May 25, 1926.

1,586,362

UNITED STATES PATENT OFFICE.

LESLIE S. HALL, OF ERIE, PENNSYLVANIA, ASSIGNOR TO WILLIAMS TOOL CORPORATION, OF ERIE, PENNSYLVANIA.

GEAR BOX FOR THREADING MACHINES AND THE LIKE.

Application filed June 20, 1925. Serial No. 38,597.

My invention relates to driving mechanism for machinery and particularly to a new type of housing for such mechanism. I have illustrated my invention as applied to a pipe threading machine to which it is peculiarly adaptable, but it will be understood by those skilled in the art that the invention is readily susceptible to many other types of machines wherein a change gear driving mechanism is necessary.

The primary object of my invention is to provide a driving mechanism and housing for the same in a unitary structure which may be easily and quickly attached or detached from the machine for repairing or overhauling.

Another object is to so construct the housing or gear box, that it may be removed together with the driving mechanism contained therein without disturbing but few other elements of the machine.

A still further object lies in the provision of means for centering the gear box in accurate alignment and correct position within the body of the machine.

Still another object is to enclose the driving and shifting gears of the mechanism within a housing that protects the working parts from dust and other foreign matter incident to the operation of the machine.

Other objects and advantages in details of construction and operation will be apparent as the description proceeds.

Referring now to the drawings wherein like reference numerals indicate like parts;

Figure 1 is a side view of a portion of a pipe threading machine showing in dotted lines the outline of my improved gear box as mounted in the machine.

Figure 2 is a top plan view of the machine, certain parts being omitted and others broken away to show my improved gear box and driving mechanism therein.

Figure 3 is an end view of the machine showing in dotted lines the position of the gear box when mounted therein.

Figure 4 is a detail plan view of the gear box and parts carried thereby.

Figure 5 is a side view of the same.

Figure 6 is a detail of the centering device.

I have illustrated at 1, a pipe threading machine provided with the usual rear chuck 2, front chuck 3, spindle 4 and bearings 5 and 6 therefor. The gear 7 mounted upon the spindle 4 is driven through mechanism about to be described.

A shaft 8 carrying at one end a pulley 9 and a friction clutch 10 comprises the initial element of the driving mechanism. The pulley 9 is removably mounted upon the outer end of shaft 8 by means of a sleeve 11 held in position by the tubular end 12 of a removable bracket 13 secured to the bed of the machine. Rotation is imparted to the shaft 12 through the pulley 9 which receives its motion from any suitable power source.

Keyed to the shaft 8 for rotation therewith and slidable thereon is a sleeve 14 to which are rigidly secured the 3 gears 15, 16 and 17. The end of the shaft 8 opposite that carrying the pulley 9 is provided with a gear 18 for driving an oil pump 19. The details of this connection are not shown and form no part of this invention.

Adjacent to and parallel with the shaft 8, is a rigid shaft 20 upon which are loosely mounted for rotation, two sleeves 35 and 36. Keyed to the sleeve 35 for rotation therewith are gears 21 and 22. Similarly mounted upon the sleeve 36 are gears 23 and 24. A third shaft 25 is mounted adjacent the shaft 20 and parallel therewith and has slidably mounted thereon and for rotation therewith gears 26 and 27. This shaft has also rigidly secured at one end thereof, the gear 28 meshing with gear 29 rigid upon shaft 30, the opposite end of which carries gear 31 which meshes with and drives gear 7 on the spindle.

The shafts 8 and 25 are supported in bushed bearings 32 in the sides of the gear box 33, which is supported in the machine in a manner to be described. The shaft 20 is fixed at either end as by means of pins or screws 34 to the sides of the gear box and does not rotate, the sleeves 35 and 36 being rotatable thereon.

The shaft 30 is mounted for rotation in bearings 37 mounted on the framework of the machine.

It will be noted that the body of gear box 33 is constructed in two sections 38 and 39, removably held together by means of bolts 38ª, and that the top section 38 is provided with an extended frame 40 whereby the box may be secured to the frame or bed of the machine as by bolts 41.

The cross piece of this frame 40 also serves to support the shafts 42 and 43, the latter of which is a sleeve shaft encircling the former and extending into the gear box to the slidable shifting gears 26 and 27. The inner end of this sleeve shaft 43 is provided with an arm 44 carrying a lateral pin 45 engaging within a recess or groove 46 around the slidable sleeve 47 upon which gears 26 and 27 are mounted. The outer end of the sleeve shaft 43 carries an operating handle 48 removably secured thereto as by means of the bolts 49 (see Figure 1). This mechanism constitutes the shifting device for the gears 26 and 27.

The inner end of shaft 42, extending to the rear of the gear box 33 adjacent the gears 15, 16 and 17, is provided with a similar shifting device including an arm 50 provided with a shifting pin 51 extending into the groove 52 formed between gear 16 and the hub of gear 17. The outer end of shaft 42 is also provided with a removable operating handle 53, thus completing the shifting device for the gears 15, 16 and 17. The handles 48 and 53 operate adjacent a bracket 54 upon which may be formed indicating characters as shown in Figure 2 representing the various speeds.

With reference to Figure 1, it will be noted that the inner ends of each of the shafts 42 and 43 are also provided with depending segments 55 and 56 provided with notches 57 for engagement with a spring pressed detent 58 provided with each segment. This is to prevent the shafts from being accidentally rotated and thereby change the speed or setting of the driving mechanism.

As will be noted with reference to Figure 1, the gear box 33 is guided and supported in the frame or bed of the machine 1, by guides 59 and 60, cast or otherwise suitably formed in the body of the machine. The box is secured against movement by means of the bolts 41 extending through a cross piece 61 and into frame 40 of the gear box. From this construction, it will be observed that the entire driving unit can be slid into position within the frame of the machine and secured.

Means are also provided for the proper centering and alignment of the elements of this mechanism, particularly the gear 28 and the shaft 8 upon which the pulley 9 is to be mounted. This means comprises tapered screw threaded pins 62 which project through aligned openings in the cross bar 40 and the cross piece 61 of the machine frame. Driving these pins home results in bringing the gear box and its attendant parts into exact position where the gear 28 will mesh properly with gear 29, and where the projecting end of shaft 8 is in proper position to receive the pulley 9. When it is desired to remove the gear box from the machine, the taper pin 62 may be removed by simply screwing downwardly the nut 63 thereon, which operates to withdraw the pin 62 upwardly out of engagement with the cross piece 40 carried by the gear box.

A shaft 64 extends through the body of the machine and is provided at one end with an arm 65 carrying a pin 66 engaging between the male and female member of the friction clutch 10. The opposite end of the shaft 64 carries an operating handle 67 secured to such said shaft as at 68. The lower projecting end of this handle 67 is pivoted to a link 69, the opposite end of which is pivoted to the lower end of a second operating handle 70, secured intermediate its end to a step shaft 71 located near the front of the machine. From this construction, it will be observed that the operator may from either end of the machine rock the shaft 67 to separate the clutch member, thereby disengage the clutch member and stop the rotation of the spindle 4.

Referring again to the change gears within the gear box, it will be noted that gear 15 is adapted to mesh with gear 21; gear 16 with gear 22 and gear 17 with gear 24. The other set of shifting gears are adapted to mesh as follows:—gear 26 with gear 21, and gear 27 with gear 23. These various combinations provide for the different speeds at which the spindle 4 may be driven. It will also be noted that by shifting the sleeve 47 to the left in Figure 2 on the shaft 25, the width of one gear, neither of the gears 26 or 27 are in mesh with the toothed gears on the shaft 20. This, of course, is a neutral position of the driving mechanism.

The operation of my invention is as follows: Assuming that the machine is assembled as shown in Figures 1 and 2, the operator may by rocking the shafts 42 and 43 by means of the handle 48 and 53, form any combination of the change gear which he desires for the speed at which the spindle is to be rotated. If it is desired to remove the driving mechanism and gear box from the machine, for any purpose, it is necessary only to remove the taper pins 62 by screwing down upon the nut 63, removing the two bolts 41, detach the handles 48 and 53 from their respective shafts and remove the bracket 13 which supports the outer end of shaft 8, whereupon the entire gear box containing the driving mechanism as a unit may be slid outwardly from the machine. Any suitable or usual means may be provided for removing the clutch shifting pin 66 out of engagement with the clutch 10 when the gear box is to be removed.

It will be understood, of course, that my invention is susceptible to many changes in details of construction and operation. I do not limit myself therefore to the structure shown and described herein, the same being the preferred embodiment only, other than by the appended claims.

I claim:—

1. In combination, a machine provided with elements to be driven, a change gear mechanism for driving said elements, a housing for said mechanism guided and removably mounted in said machine, and means for centering said housing in said machine in proper relation to said elements, said means including a frame on said housing and taper pins engageable therewith.

2. In combination, a machine provided with elements to be driven, a removable housing enclosing change gear mechanism including shifting devices, a clutch for connecting said gear mechanism and said element, and means for centering said housing in said machine in proper relation to said elements, said means comprising a frame on said housing provided with apertures, corresponding apertures in said machine, and taper pins engageable in said apertures.

3. In combination a machine provided with elements to be driven, a change gear mechanism for driving said elements, a housing for said mechanism guided by and removably mounted in said machine, and means for centering said housing in said machine in proper relation to said elements, said means comprising a frame on said housing provided with apertures, corresponding apertures in said machine, threaded taper pins engageable in said apertures and adjusting nuts on said threaded portions.

LESLIE S. HALL.